March 5, 1929.  A. F. BELITZ  1,703,860

FLUID BRAKE CONTROL MECHANISM

Filed Feb. 1, 1924

INVENTOR.
ARTHUR F. BELITZ
BY
Ralph W. Brown
ATTORNEY.

Patented Mar. 5, 1929.

1,703,860

UNITED STATES PATENT OFFICE.

ARTHUR F. BELITZ, OF MILWAUKEE, WISCONSIN.

FLUID-BRAKE CONTROL MECHANISM.

Application filed February 11, 1924. Serial No. 691,907.

This invention relates to controls for fluid actuated brakes for motor vehicles and the like.

One object of the present invention is the provision of a control for fluid brakes, such that the application and release of the brake pressure may be made to respond to that action on the part of the operator which is usually required in operating ordinary mechanical brakes.

Another object is the provision of a control for fluid brakes by which the degree of pressure applied to the brakes may be responsive to the extent of movement of, or the degree of pressure applied to, a single control element.

Other objects and advantages will hereinafter appear from the following description of an illustrative embodiment of the present invention.

Figure 1:
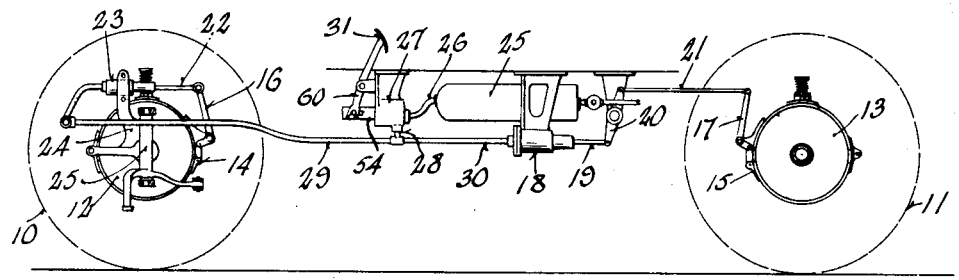
Figure 1 is a diagrammatic view of the running gear of an automobile, equipped with air brakes, and a control therefor constructed in accordance with the present invention.

The automobile diagrammatically illustrated in Figure 1 comprises the usual front and rear wheels 10 and 11 provided with brake drums 12 and 13, cooperating with band brakes 14 and 15, controlled by the usual levers 16 and 17. The lever 17 of the rear brake is actuated and controlled from a piston and cylinder 18 through a link 19, lever 20, and rod 21. The lever 16 of the front brake is actuated and controlled by a link 22 operatively connected with a piston and cylinder 23 carried by a bracket 24 forming a part of the usual steering spindle 25. The cylinders 18 and 23 are both supplied with air under pressure from an appropriate reservoir tank 25, through pipe 26, valve chest 27, pipe 28, and distributing pipes 29 and 30. The valve chest 27 and associated parts, under the control of the usual brake pedal 31, control the application and exhaust of air pressure to and from the brake cylinders in a manner to be hereinafter described.

Figure 2:
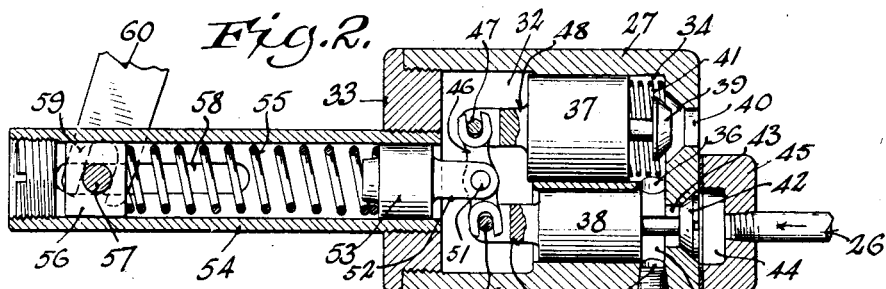
Figure 2 is a sectional view, on a somewhat larger scale, of the control mechanism.
Figure 3:
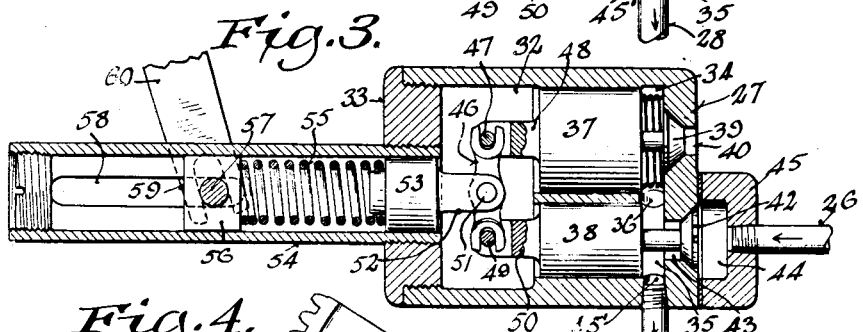
Figure 3 is a view similar to Figure 2 with the parts in a different operating position.

In the control mechanism shown in Figures 2 and 3, the valve chest 27 is in the form of a cylindrical casting hollowed out to provide a chamber 32 which is closed by an end head 33 screwed into the end thereof. The interior of the casting is bored to form two parallel cylinders 34 and 35 which communicate through a port 36 adjacent the inner closed ends thereof. Pistons 37 and 38 are closely fitted for lengthwise reciprocation in the cylinder bores. A valve 39 fixed to one of the pistons cooperates with an air exhaust port 40 in the end wall of the chest. This valve is arranged to open inwardly under the influence of a light compression spring 41. Air admitted under pressure to the cylinder 34 also tends to open this valve by the pressure exerted thereby against the face of the piston 37.

A valve 42 fixed to the piston 38 cooperates with an air admission port 43 in the end wall of the chest. This valve opens outwardly into an air supply chamber 44 formed in a block 45 fixed to the chest, the valve being yieldably retained in closed position by the pressure of air supplied to the chamber through the pipe 26 hereinabove referred to. The pipe 28 leading to the brake cylinders communicates at all times with cylinder bore 35 through a port 45, and consequently with the cylinder bore 34 through port 36, so that, when valve 42 is opened and valve 39 closed, air under pressure is admitted from the supply pipe 26, through port 43 to pipe 28 and, when valve 42 is closed and valve 39 opened, air from pipe 28 is permitted to escape through the exhaust port 40.

In this instance, valves 39 and 42 are placed under the control of a single control element associated with the pistons 37 and 38 in such manner that the degree of air pressure in the pipe 28 is made to depend upon the position of the control element. This may be accomplished in various ways but the mechanism shown in Figures 2 and 3 is satisfactory for this purpose.

The mechanism therein shown comprises a floating lever 46 rockably associated at one end with a pin 47 carried by a post 48 on the piston 37 and at the other end with a pin 49 carried by a post 50 on the piston 38. This lever is rockably supported intermediate its ends upon a pin 51 carried by a post 52 secured to a cylindrical block 53 fitted for reciprocation in a tube 54. Tube 54 is fixed in the end head 33 and extends therefrom in a direction parallel to the axes of reciprocation of the pistons 37 and 38. A heavy compression spring 55 within the tube 54 bears at one end against the block 53 and at the other end against a similar block 56 reciprocable within the tube. The block 56 is actuated and controlled by the brake pedal 31 and for this purpose is provided with a pin 57 extending therethrough and through slots 58 formed in the tube and engaging the spaced, forked ends 59 of the pedal lever 60.

With the slide block 56 in the extreme left position of Figure 2 the pressure of spring 55 is at a minimum, valve 39 is retained in open position by the spring 41, and valve 42 is held closed by the air pressure in the chamber 44. In this position of the parts, the pressure in the pipe 28 is released and brake pressure is zero. To apply pressure to the brake cylinders 18 and 23 the brake pedal 31 is depressed in the usual manner, thereby rocking the lever 60 in a counterclockwise direction (Fig. 1) and forcing block 56 to the right toward the position shown in Figure 3. This obviously increases the pressure of the spring 55 which is transmitted to the center of the floating lever 46 through the slide block 53. As this pressure increases the floating lever rocks upon the pin 49 in such direction as to close valve 39 against the action of spring 41, and then rocks upon the pin 47 in such direction as to open the valve 42 against the pressure of air in the chamber 44. When this occurs air is admitted through port 43 to the cylinder bores 34 and 35 and through pipe 28 to the brake actuating cylinders 18 and 23 and the brakes are applied.

It will be noted that the air pressure in pipe 28, which, of course, corresponds to the brake pressure, is always substantially equal to the pressure of air in the cylinder bores 34 and 35. As this pressure builds up during the open condition of the port 43 it acts upon piston 38 tending to close the valve 42 against the pressure of spring 55, and actually closing this valve when the pressure has reached a certain maximum as determined by the pressure in the spring 55. To obtain a greater brake pressure it is only necessary to establish a greater pressure in spring 55 by further depressing the pedal 31 and forcing the block 56 further toward the right (Fig. 3).

The air pressure thus established in the bores 35 and 34 tends to shift the piston 37 to the left to open the exhaust valve 39. This effect is opposed, in part, by the air pressure on the valve 39 tending to retain the valve in closed position. The two pistons 37 and 38 and consequently the valves 39 and 42 are thus under the joint control of the pressure in the spring 55 and the pressure of air in the bores 35 and 34, the parts being so designed, however, that, with a given pressure in the spring 55, the inlet valve 42 will close at a pressure of air in the bores 34 and 35 less than that required to open the exhaust valve 39. To reduce the pressure in the bores 34 and 35, and consequently the brake pressure, it is only necessary to reduce the pressure of the spring 55 by reducing the pressure on the brake pedal 31 and permitting the block 56 to return toward the position of Figure 2. This permits the air pressure in the bore 34 to force the piston 37 toward the left against the reduced pressure of spring 55 and the valve 39 opens. The air from the brake cylinders 18 and 23 then escapes through the pipe 28 and exhaust port 40, until the pressure therein and in the bore 34 has been reduced to a degree dependent upon the remaining pressure in the spring 55. By completely releasing the pressure on the brake pedal the parts are returned to the positions of Figure 2 and the brakes are entirely released.

Figure 4:
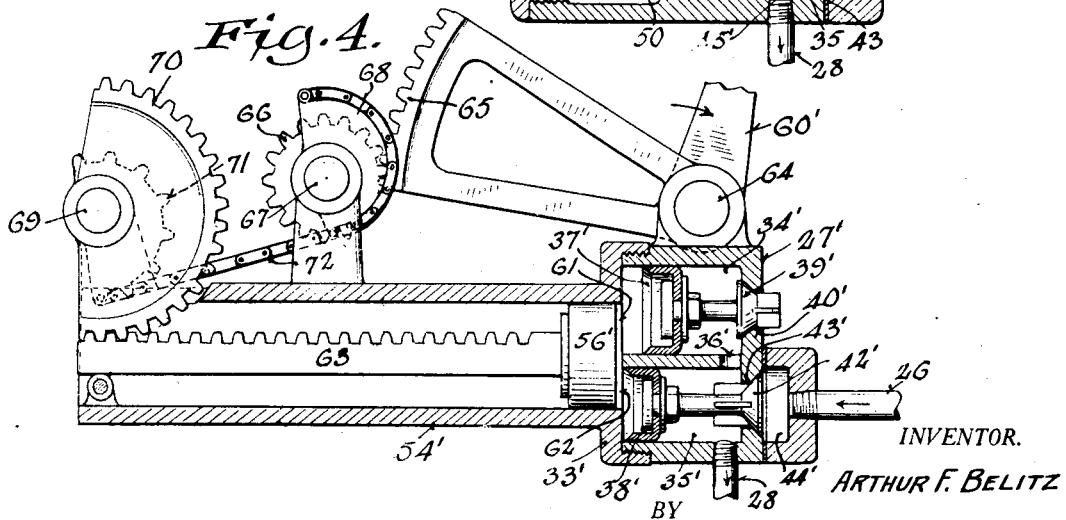
Figure 4 is a sectional view of a control mechanism of somewhat different form.

The form of control mechanism shown in Figure 4 is similar in many respects to that above described except that an air cushion is substituted for the control spring. The valve chest is, in this instance, in the form of a solid cylindrical casting 27' bored out to form the two parallel cylinder bores 34' and 35' in which the pistons 37' and 38' reciprocate. An exhaust port 40' is controlled by a valve 39' connected to piston 37', and the air inlet port 43' is controlled by a valve 42' connected to piston 38'. An end head 33' screwed onto the end of the casting 27' carries a cylinder 54' formed integral therewith. The cylinder 54' communicates at all times with the bores 34' and 35' through ports 61 and 62. A control piston 56', closely fitted for reciprocation in cylinder 54', is actuated and controlled by a rack bar 63 connected therewith.

Figure 4 illustrates the position of the parts when the brake pressure is fully applied. The air trapped in the rear ends of bores 34' and 35' and the forward end of cylinder 54' has been compressed by the advance of piston 56'. As this air pressure increased with the advance of the piston 56' it first shifted the piston 37' to the right and closed the exhaust valve 39', and thereafter shifted the piston 38' to the right and opened the inlet valve 42' against the pressure of air in chamber 44'. This caused the admission of air under pressure from the supply pipe 26 to the brakes through the pipe 28, until the air in the forward end of bores 34' and 35' was sufficient to return the piston 38' and valve 42' to closed position. The degree of pressure in pipe 28, which corresponds to the brake pressure, is thus made to depend upon the degree of pressure of the air in the forward end of cylinder 54'. To release the brake pressure it is only necessary to retract the piston 56' to thereby reduce the air pressure in the cylinder 54' and permit the air in the forward end of bore 34' to shift the piston 37' to the left to open the exhaust valve 39'.

When the piston 56' is fully retracted the air in the cylinder 54' is at substantially atmospheric pressure, so that a considerable advance of the piston is ordinarily necessary before the air is sufficiently compressed to operate the valves in the manner described. The piston 54' is therefore preferably placed under the control of mechanism, which, under the uniform advance of an actuating element, will produce a relatively fast advance of the piston at the beginning of its stroke and a relatively slow advance at the end of the stroke. Mechanism for this purpose is illustrated in Figure 4.

This mechanism is actuated by a foot lever 60' pivotally mounted at 64 having a segmental rack 65 formed integral therewith. Rack 65 meshes with a gear 66 secured upon a rock shaft 67, having an eccentric 68 fixed thereto. A second rock shaft 69 carries a segmental gear 70, meshing with the rack bar 63, and an eccentric 71. A flexible chain or strap 72 bears upon the peripheries of the two eccentrics 68 and 71 and has its opposite ends fixed thereto. The arrangement is such that with the parts in the position shown, with the piston 54' adjacent the end of its advance stroke, the short radius of the eccentric 68 is effective upon the long radius of the eccentric 71 through the strap 72, so that rocking of the eccentric 68 will have a minimum effect on the eccentric 71; whereas, when the piston is in its retracted position or at the beginning of its advance stroke, the long radius of the eccentric 68 is effective upon the short radius of the eccentric 71, and rocking of the eccentric 68 will have a maximum effect upon the eccentric 71. Thus, as the foot lever 60' is rocked at a uniform rate in the direction of the arrow (Fig. 4) from its fully retracted position toward the position shown, the rack bar 63 and piston 56' move toward the right at a maximum rate at the beginning of the stroke and at a gradually reduced rate as the piston approaches the end of the stroke.

Various changes may be made in the embodiments of the invention hereinabove described, without departing from or sacrificing any of the advantages of the invention as defined in the appended claims.

I claim:

1. In a fluid actuated brake the combination of brake applying means, a source of fluid pressure, a valve chest communicating with said brake applying means, said chest having a port in communication with said pressure source and an exhaust port, separately operated valves controlling said ports, separate means each responsive to the pressure in said chest for controlling said valves, and means for modifying the action of said last named means to regulate the pressure in said chest and consequently the action of said brake applying means.

2. In a fluid actuated brake the combination of brake applying means, a source of fluid pressure, a valve chest communicating with said brake applying means, a valve for controlling the admission of pressure from said source to said chest, a second valve for releasing the pressure in said chest, separate means actuated by the pressure in said chest for independently actuating said valves in one direction, and means for actuating said valves in another direction to regulate the pressure in said chest and consequently in said brake applying means.

3. A control mechanism for fluid actuated brakes comprising a valve chest having an inlet port and an exhaust port, valves controlling said ports, pistons responsive to the pressure in said chest for independently actuating said valves, and means under the control of the operator for modifying the effect of said pressure upon said pistons to control said valves.

4. A control mechanism for fluid actuated brakes comprising a valve chest having an inlet port and an exhaust port, valve mechanism for controlling said ports, means responsive to the pressure in said chest for operating said valve mechanism, a control member actuated by the operator, and fluid means responsive to the pressure applied by the operator to said member for regulating said first named means to change the pressure in said chest in accordance with changes in pressure applied to said member.

5. A control mechanism for fluid actuated brakes comprising a valve chest having inlet and exhaust ports and a passage for operating connection with a brake, valve means controlling said ports for determining the degree of pressure in said passage, means responsive to the pressure in said passage for operating said valve means, a control member actuated by the operator, and means responsive to the pressure applied to said member by the operator for modifying the action of said valve operating means to regulate the pressure in said passage.

6. A control mechanism for fluid actuated brakes comprising a valve chest having air inlet and exhaust ports and an air passage for connection with a brake, valve means co-operating with said ports for controlling the pressure of air in said passage, said valve means being influenced by said air pressure, means for applying pressure to said valve means in opposition to said air pressure, a control member actuated by the operator, and means responsive to the degree of pressure applied by the operator to said member for regulating said last named means to regulate the degree of air pressure in said passage.

In witness whereof, I hereunto subscribe my name this 5th day of February, 1924.

ARTHUR F. BELITZ.